(12) United States Patent
Smilovici et al.

(10) Patent No.: US 8,556,546 B2
(45) Date of Patent: Oct. 15, 2013

(54) CUTTING INSERT HAVING CUTTING EDGES WITH RECESSED PORTIONS

(75) Inventors: Carol Smilovici, Nahariya (IL); Osama Atar, Yarka (IL)

(73) Assignee: Iscar, Ltd., Tefen (IL)

( * ) Notice: Subject to any disclaimer, the term of this patent is extended or adjusted under 35 U.S.C. 154(b) by 278 days.

(21) Appl. No.: 12/983,642

(22) Filed: Jan. 3, 2011

(65) Prior Publication Data

US 2011/0170963 A1 Jul. 14, 2011

(30) Foreign Application Priority Data

Jan. 13, 2010 (IL) .......................................... 203283

(51) Int. Cl.
*B23C 5/20* (2006.01)
(52) U.S. Cl.
CPC ....................................... *B23C 5/20* (2013.01)
USPC ................ 407/42; 407/61; 407/114; 407/116
(58) Field of Classification Search
USPC ........................... 407/42, 47, 48, 61, 113–116
IPC .......................................................... B23C 5/20
See application file for complete search history.

(56) References Cited

U.S. PATENT DOCUMENTS

| | | | |
|---|---|---|---|
| 3,574,911 A | 4/1971 | Penoyar | |
| 3,636,602 A | 1/1972 | Owen | |
| 3,922,766 A | 12/1975 | Malinchak | |
| 4,531,864 A * | 7/1985 | Bylund | 407/114 |
| 4,867,616 A * | 9/1989 | Jakubowicz | 407/58 |
| 4,936,714 A | 6/1990 | Demircan | |
| 4,936,719 A | 6/1990 | Peters | |
| 5,791,832 A * | 8/1998 | Yamayose | 407/113 |
| 6,565,296 B2 * | 5/2003 | McKinley et al. | 408/224 |
| 6,921,233 B2 * | 7/2005 | Duerr et al. | 407/34 |
| 7,241,082 B2 | 7/2007 | Smilovici et al. | |
| 2010/0226726 A1 | 9/2010 | Strasmann | |

FOREIGN PATENT DOCUMENTS

| | | |
|---|---|---|
| DE | 10 2009 002738 A1 | 9/2010 |
| EP | 2 106 870 A1 | 10/2009 |
| GB | 2054427 A * | 2/1981 |
| WO | 2010/021463 | 2/2010 |
| WO | WO 2010/098345 A1 | 9/2010 |

OTHER PUBLICATIONS

International Search Report dated Apr. 21, 2011 issued in corresponding International Application No. PCT/IL2010/001053.

* cited by examiner

*Primary Examiner* — Daniel Howell
*Assistant Examiner* — Alan Snyder
(74) *Attorney, Agent, or Firm* — Womble Carlyle

(57) ABSTRACT

A cutting insert has a cutting edge formed at the intersection of a side surface an end surface. Recesses formed in the side surface interrupt the cutting edge at recessed cutting edge portions. Each recessed cutting edge portion has, in an end view of the cutting insert, a curved central section located between two curved side sections. The central section has a first radius of curvature and each side section has a second radius of curvature, the first radius of curvature being larger than the second radius of curvature.

19 Claims, 4 Drawing Sheets

CUTTING INSERT HAVING CUTTING EDGES WITH RECESSED PORTIONS

FIELD OF THE INVENTION

The present invention relates to cutting inserts having cutting edges with recessed portions.

BACKGROUND OF THE INVENTION

Cutting inserts having cutting edges with recessed portions, such as notches or grooves, are generally used for rough milling machining of metallic work pieces at high metal removal rates.

There are many examples disclosed in the art of cutting inserts having cutting edges with recessed portions. Triangular, square, round, and rectangular shaped cutting inserts are disclosed, respectively, in U.S. Pat. Nos. 3,574,911; 3,636,602; 3,922,766; and 4,936,719.

However, in such prior art cutting inserts the form of the recessed portions are generally not optimized for all-round performance and in many cases the cutting inserts are liable to break at the cutting edges during milling operations. Moreover, the general geometry of prior art cutting inserts having cutting edges with recessed portions is in many cases limited to the form of flat slabs with opposing flat parallel rake and base surfaces, or simple positive geometries, thereby limiting the range of applications of the cutting inserts.

SUMMARY OF THE INVENTION

In accordance with the present invention, there is provided a cutting insert comprising opposing end surfaces and a peripheral side surface extending therebetween. The peripheral side surface includes a major side surface. A major cutting edge is formed at the intersection of the major side surface with one of the end surfaces. The end surface includes a rake surface along which chips cut from a workpiece during a machining operation flow.

According to the present invention recesses formed in the major side surface interrupt the major cutting edge at recessed cutting edge portions. Each recessed cutting edge portion is located between two non-recessed cutting edge portions. In an end view of the cutting insert, when viewing the end surface with the major cutting edge, each recessed cutting edge portion comprises a curved central section located between two curved side sections.

This structure of the recessed cutting edge portions has proven to be advantageous in milling operations, especially rough milling of metallic work pieces at high metal removal rates. On the one hand the interrupted cutting edge causes chip splitting and on the other hand the curved sections provide a robust interrupted cutting edge which can withstand greater cutting forces without breaking in comparison with interrupted cutting edges in which the recessed cutting edge portions do not have this curved structure.

In accordance with a preferred embodiment, the central section has a first radius of curvature and each side section has a second radius of curvature, the first radius of curvature being larger than the second radius of curvature. This particular structure provides further strengthening of the interrupted cutting edge.

In accordance with certain specific applications optimized for best performance, the first radius of curvature is in the range 0.7 to 0.9 mm and the second radius of curvature is in the range 0.3 to 0.5 mm.

In accordance with a particular application, the first radius of curvature is equal to 0.83 mm and the second radius of curvature is equal to 0.4 mm.

The non-recessed cutting edge portions may have any one of a number of suitable geometries. In accordance with some embodiments, each non-recessed cutting edge portion may be a section of one selected from the group consisting of a straight line, an ellipse and a helix.

The present invention finds particular application with double-sided (or, double-ended) cutting inserts having "reversed-relief" primary relief surfaces. Such cutting inserts are disclosed in U.S. Pat. No. 7,241,082.

In accordance some embodiments of the present invention, the two opposing end surfaces are identical and the peripheral side surface comprises two opposing identical major side surfaces. There are four spaced apart major cutting edges. Each major cutting edge is formed at the intersection of each major side surface with each end surface. Each end surface includes associated rake surfaces. Each associated rake surface extends from a respective major cutting edge in a generally inward direction of the cutting insert to an inner end surface. Each major side surface includes associated primary relief surfaces. Each associated primary relief surface extends from a respective major cutting edge towards a middle region of the major side surface in which it is included. In each cross section of the cutting insert taken in a plane generally perpendicular to the major side surfaces, a line tangent to each primary relief surface at a non-recessed cutting edge portion of the major cutting edge is inclined to a median plane of the cutting insert at an acute interior angle (referred herein as a "reversed-relief" primary relief surface). Each end surface has four corners, two diagonally opposed lowered corners and two diagonally opposed raised corners, the lowered corners being closer to the median plane than the raised corners.

The invention is also directed to a milling cutter having at least two cutting inserts of the sort described above.

BRIEF DESCRIPTION OF THE DRAWINGS

For a better understanding of the present invention and to show how the same may be carried out in practice, reference will now be made to the accompanying drawings, in which.

DETAILED DESCRIPTION OF THE INVENTION

Attention is first drawn to FIGS. 1 to 7, showing a cutting insert 10 with respect to which the present invention will be described and illustrated. However, the present invention relates to properties of the cutting edges of cutting inserts and while it is certainly applicable to the cutting insert shown in the figures, it is by no means restricted to this cutting insert which is used herein as a non-binding example. The cutting insert 10 is indexable, and is preferably manufactured by form-pressing or by injection molding and sintering carbide powders. The cutting insert 10 comprises two identical opposing end surfaces 12 of a generally rectangular shape in an end view of the cutting insert 10.

Figure 8:
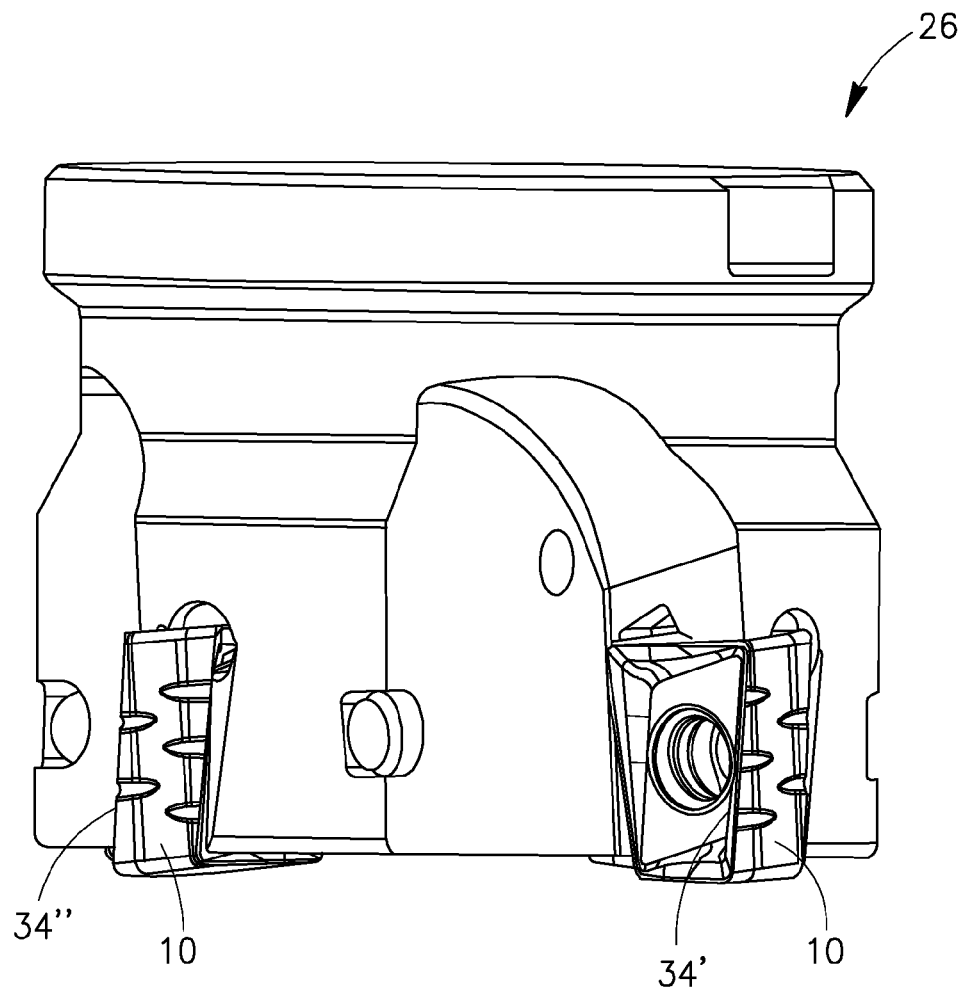
FIG. 8 is a side view of a milling cutter having cutting inserts in accordance with embodiments of the present invention.

A peripheral side surface 14 extends between the two opposing end surfaces 12 and comprises two opposed identical minor side surfaces 16, two opposed identical major side surfaces 18 of a generally parallelogrammatic shape, and corner side surfaces 20 located between adjacent minor and major side surfaces 16, 18. The cutting insert 10 is provided with a through bore 22 extending between, and opening out to, the end surfaces 12. The through bore 22 is for receiving a clamping screw to secure the cutting insert 10 to a milling cutter 26 (FIG. 8).

Each end surface 12 has four corners, two diagonally opposed raised corners 28 and two diagonally opposed lowered corners 30. The raised corners 28 of each end surface 12 lie in an end surface plane P. A median plane M of the cutting insert 10 is parallel to, and lies midway between, the end surface planes P. The lowered corners 30 are closer to the median plane M than the raised corners 28. Each corner side surface 20 extends between a given raised corner 28 of one of the two opposing end surfaces 12 and a given lowered corner 30 of the other of one of the two opposing end surfaces 12.

The cutting insert 10 has a central axis B which passes through the through bore 22 connecting the opposing end surfaces 12. The cutting insert 10 has 180° rotational symmetry about a major axis A which passes through the two opposed identical minor side surfaces 16, lies on the median plane M and is perpendicular to the central axis B.

Figure 1:
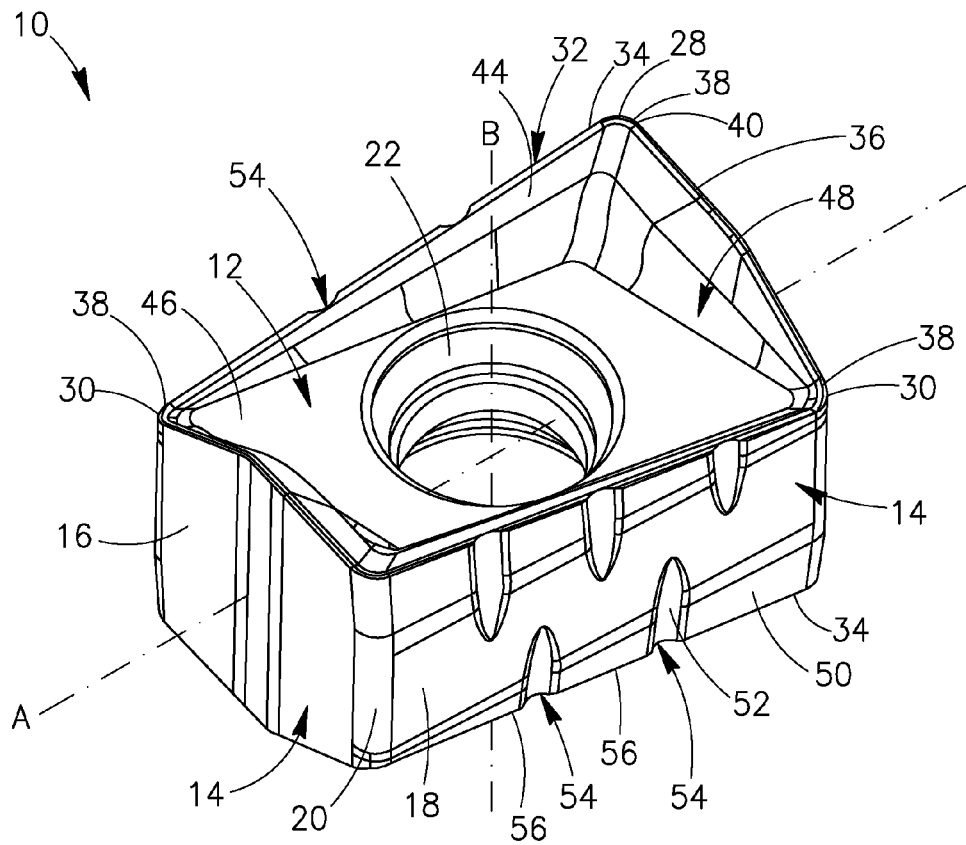
FIG. 1 is a perspective view of a cutting insert in accordance with the present invention.
Figure 2:
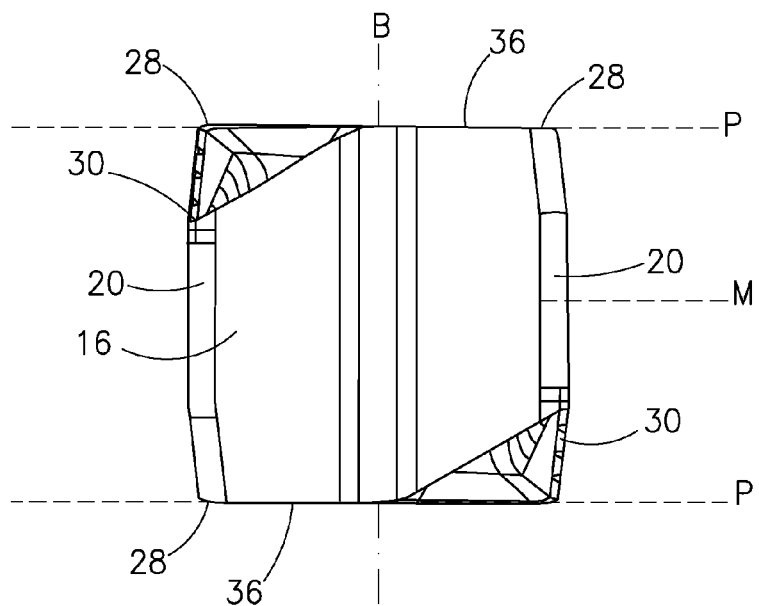
FIG. 2 is a minor side view of the cutting insert in FIG. 1.

A peripheral edge 32 is formed at the intersection of each end surface 12 and the peripheral side surface 14. For each end surface 12, the peripheral edge 32 comprises two major cutting edges 34, formed by the intersection of the major side surfaces 18 with the end surface 12; two minor cutting edges 36, formed by the intersection of the minor side surfaces 16 with the end surface 12; and four corner edges 38, two raised corner edges 40 (each formed at a respective raised corner 28) and two lowered corner edges 42 (each formed at a respective lowered corner 30), formed by the intersection of the corner side surfaces 20 with the end surface 12. The raised corner edges 40 are corner cutting edges. If desired, the lowered corner edges 42 may also be corner cutting edges. In the embodiment shown in the figures, each major cutting edge 34 extends between a given raised corner edge 40 and given lowered corner edge 42. Similarly, each minor cutting edge 36 extends between a given raised corner edge 40 and given lowered corner edge 42. As best seen in FIG. 2, a first portion of each minor cutting edge 36 extends along the end surface plane P away from the given raised corner edge 40 (at a given raised corner 28). The first portion connects to a second portion of that minor cutting edge 36 which extends away from the end surface plane P towards the given lowered corner edge 42 (at a given lowered corner 30).

Rake surfaces 44 are formed in each end surface 12 adjacent the major and minor cutting edges 34, 36 and the corner cutting edges 40 (42). The rake surfaces 44 extend from the major and minor cutting edges 34, 36 and from the corner cutting edges 40 (42) in an inward direction of the cutting insert 10 to an inner end surface 46. If desired, the inner end surface 46 of each end surface 12 is flat and the inner end surfaces 46 of each end surface 12 are parallel to each other. Preferably, in an end-view of the cutting insert 10, the inner end surfaces 46 have the form of a distorted parallelogram (see FIG. 3). During a metal cutting operation, chips cut from a workpiece flow from the part of the cutting edge that is in contact with the workpiece, along the rake surface 44 towards the inner end surface 46 and in some applications continue to flow along at least part of the inner end surface 46. Therefore, the rake surface 44 and the inner end surface 46 form a chip surface 48 of the cutting insert 10.

Each major side surface 18 comprises a primary relief surface 50 adjacent each major cutting edge 34 extending from the major cutting edge 34 towards a middle region of the major side surface 18 and towards the median plane M. In each cross section of the cutting insert 10 taken in a plane generally perpendicular to the major side surfaces 18 a line L tangent to the primary relief surface 50 at the major cutting edge 34 is inclined to the median plane M of the cutting insert 10 at an acute interior angle α (see FIG. 5). The interior angle α may be constant or may vary continuously along the major cutting edge 34.

Figure 3:
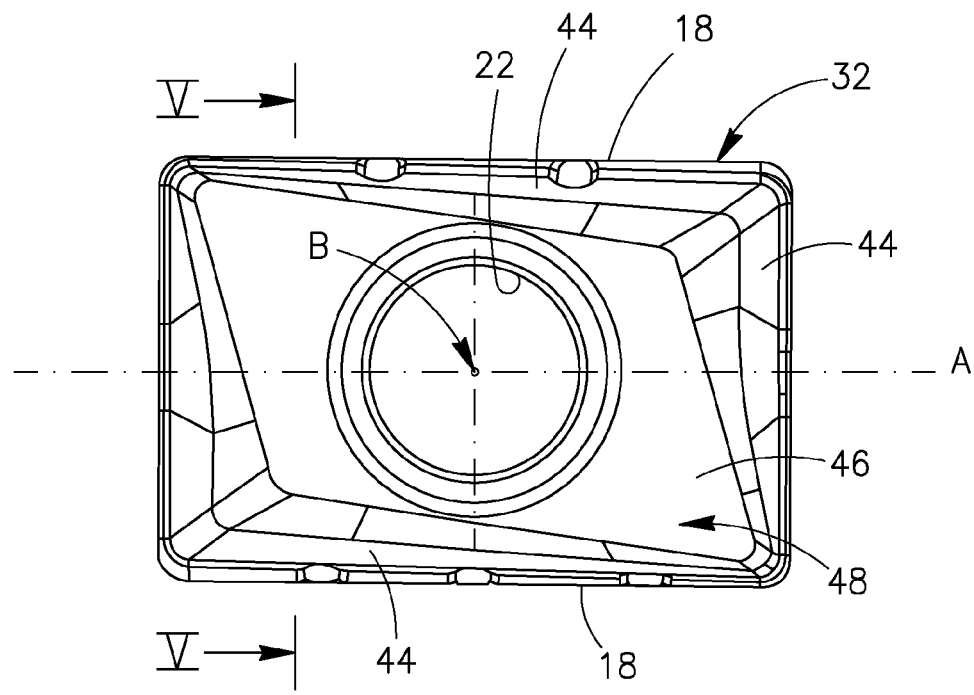
FIG. 3 is an end view of the cutting insert shown in FIG. 1.
Figure 6:
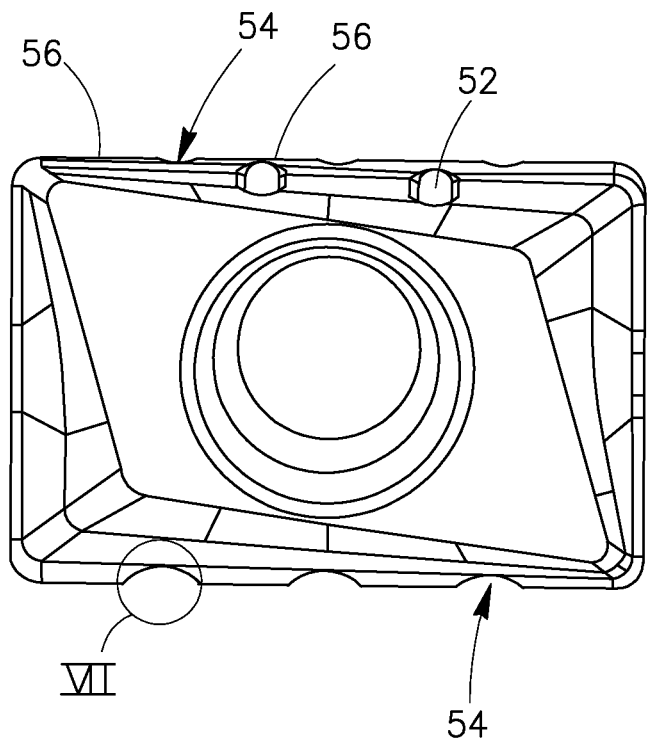
FIG. 6 is an end view of the cutting insert similar to that shown in FIG. 3 but with the cutting insert rotated about the major axis A.
Figure 7:
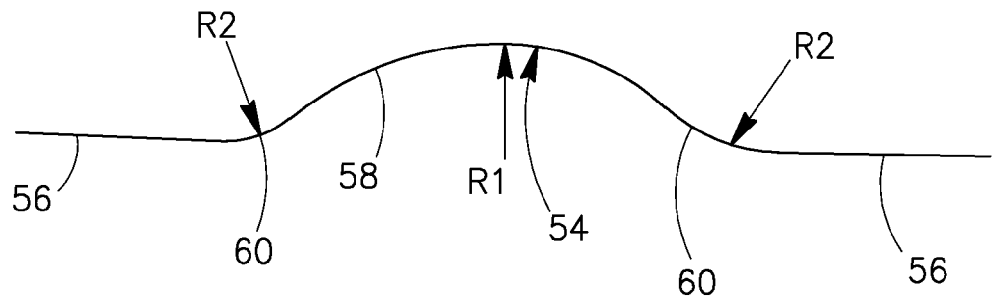
FIG. 7 is a detail of the cutting edge of the cutting insert shown in FIG. 6.

Recesses 52 formed in the major side surfaces 18 interrupt the major cutting edges 34 at recessed cutting edge portions 54. Each recessed cutting edge portion 54 is located between two non-recessed cutting edge portions 56. As can be seen in FIGS. 3 and 6 and more clearly in the detailed view in FIG. 7, in an end view of the cutting insert each recessed cutting edge portion 54 comprises a curved central section 58 located between two curved side sections 60. The central section 58 has a first radius of curvature R1 and each side section 60 has a second radius of curvature R2. The first radius of curvature R1 is larger than the second radius of curvature R2. In some applications of the cutting insert 10 in milling machining operations, optimal performance of the cutting insert 10 was obtained with the first radius of curvature R1 in the range 0.7 to 0.9 mm and the second radius of curvature R2 in the range 0.3 to 0.5 mm. In a particular application, optimal performance was obtained with the first radius of curvature R1 equal to 0.83 mm and the second radius of curvature R2 equal to 0.40 mm.

It will be appreciated that if the recessed cutting edge portions 54 were not present, then the non-recessed cutting edge portions 56 would together comprise continuous, uninterrupted major cutting edges 34. As is well known, in milling operations the major cutting edges 34 can have any required suitable geometry. For example, they may be straight, i.e., straight line sections, or sections of an ellipse or sections of a helix. Consequently, with the presence of the recessed cutting edge portions 54, the non-recessed cutting edge portions 56 may also have any one of a number of suitable geometries. For example, each non-recessed cutting edge portion 56 may be a section of a straight line, an ellipse or a helix.

Figure 4:
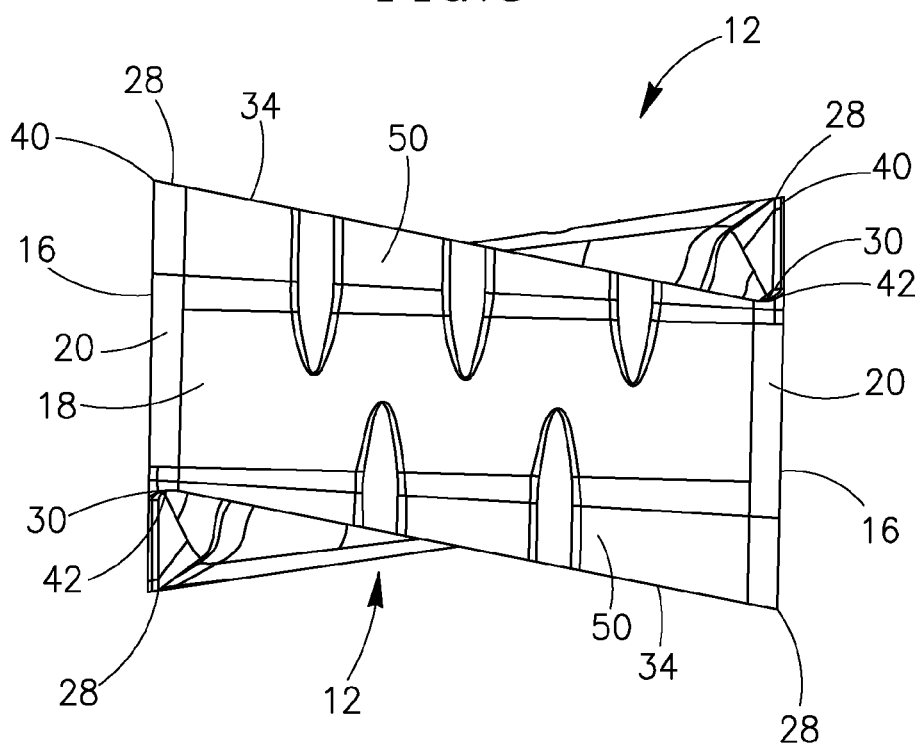
FIG. 4 is a major side view of the cutting insert shown in FIG. 1.
Figure 5:
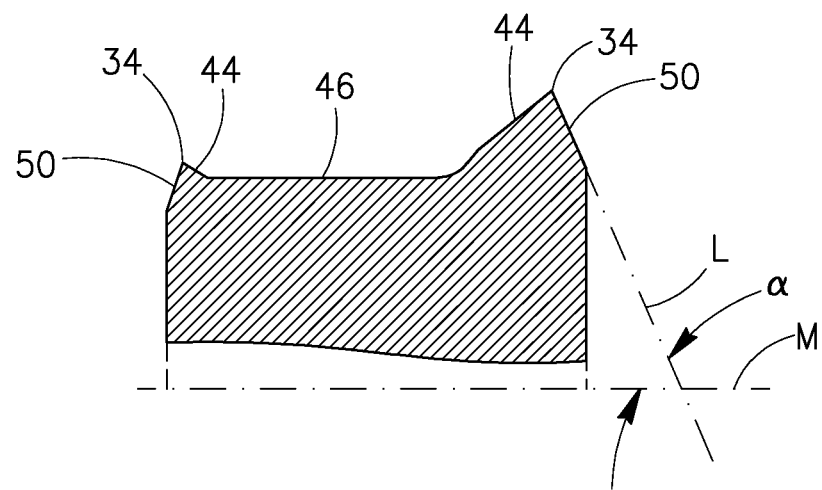
FIG. 5 is a partial cross section of the cutting insert shown in FIG. 1 taken along the line V-V in FIG. 3.

In accordance with a particular application, the two major cutting edges 34 associated with a given major side surface 18 have a different number of recessed cutting edge portions 54. For example, in accordance with some embodiments one of the two major cutting edges 34 associated with a given major side surface 18 may have an even number of recessed cutting edge portions 54 and the other one of the two major cutting edges 34 associated with the given major side surface 18 may have an odd number recessed cutting edge portions 54. In accordance with some embodiments one of the two major cutting edges 34 associated with a given end surface 12 may have an even number of recessed cutting edge portions 54 and the other one of the two major cutting edges 34 associated with the given end surface 12 may have an odd number recessed cutting edge portions 54. Due the differing numbers of recessed cutting edge portions 54 associated with the major cutting edges 34 associated with a given end surface 12, the cutting insert 10 does not have 180° rotational symmetry about the central axis B. Also, as seen in FIG. 4, in a major side view of the cutting insert 10, a maximum width among the recessed cutting edge portions 54 is less than a minimum width among the non-recessed cutting edge portions 56.

Preferably, the recessed cutting edge portions 54 in the two major cutting edges 34 associated with the given major side surface 18 are staggered relative to each other. In accordance with a specific non-binding example shown in the figures, the number recessed cutting edge portions 54 in one of the two major cutting edges 34 mentioned above is two while the number in the other of the two major cutting edges 34 associated with the same end surface 12 is three.

Attention is now drawn to FIG. 8, in which two cutting inserts 10 secured to the milling cutter 26 can be seen. One of the cutting inserts 10 has an operative major cutting edge 34' with three recessed cutting edge portions 54 whereas the other cutting insert has an operative major cutting edge 34" with two recessed cutting edge portions 54. The recessed cutting edge portions 54 of the two operative major cutting edges 34', 34" are staggered relative to each other. Since the recessed cutting edge portions 54 of the operative major cutting edges 34', 34" of these two cutting inserts are staggered relative to each other, the two operative major cutting edges 34', 34" complement one another to make a full cut in a work piece being milled. It has been found that it is not necessary to arrange all the cutting inserts 10 around the milling cutter in pairs having alternating operative major cutting edges 34 with staggered recessed cutting edge portions 54. Thus, in accordance with some embodiments, only two of the cutting inserts 10 are arranged to have operative major cutting edges 34 with staggered recessed cutting edge portions 54.

Although the present invention has been described to a certain degree of particularity, it should be understood that various alterations and modifications could be made without departing from the spirit or scope of the invention as hereinafter claimed.

What is claimed is:

1. A cutting insert comprising:
    opposing end surfaces and a peripheral side surface extending therebetween, the peripheral side surface comprising a major side surface;
    a major cutting edge formed at the intersection of the major side surface with one of the end surfaces; wherein:
    the major side surface has recesses formed therein interrupting the major cutting edge at recessed cutting edge portions, each recessed cutting edge portion being located between two non-recessed cutting edge portions;
    each recessed cutting edge portion comprising, in an end view of the cutting insert, viewing the end surface with the major cutting edge, a curved central section located between two curved side sections, the central section having a first radius of curvature and each side section having a second radius of curvature, the first radius of curvature being larger than the second radius of curvature.

2. The cutting insert according to claim 1, wherein the first radius of curvature is in the range 0.7 to 0.9 mm and the second radius of curvature is in the range 0.3 to 0.5 mm.

3. The cutting insert according to claim 1, wherein the first radius of curvature is equal to 0.83 mm and the second radius of curvature is equal to 0.40 mm.

4. The cutting insert according to claim 1, wherein each non-recessed cutting edge portion is a section of one selected from the group consisting of a straight line, an ellipse and a helix.

5. The cutting insert according to claim 1, comprising:
    two identical opposing end surfaces, each end surface having four corners including two diagonally opposed lowered corners and two diagonally opposed raised corners, the lowered corners being closer to a median plane of the cutting insert than the raised corners;
    two opposing major side surfaces extending between the opposing end surfaces;
    four major cutting edges, each major cutting edge being formed at the intersection of each major side surface with each end surface;
    a rake surface associated with each major cutting edge, each rake surface extending in a respective end surface from an associated major cutting edge in a generally inward direction of the cutting insert to an inner end surface; and
    a primary relief surface associated with each major cutting edge, each primary relief surface extending from an associated major cutting edge towards a middle region of the major side surface in which it is included; wherein:
    in each cross section of the cutting insert taken in a plane generally perpendicular to the major side surfaces, a line tangent to each primary relief surface at a non-recessed cutting edge portion of the major cutting edge is inclined to the median plane of the cutting insert at an acute interior angle.

6. The cutting insert according to claim 1, wherein:
    in a major side view of the cutting insert, a maximum width among the recessed cutting edge portions is less than a minimum width among the non-recessed cutting edge portions.

7. The cutting insert according to claim 1, further comprising:
    a central axis (B) which passes through a through bore passing between the opposing end surfaces; wherein:
    the cutting insert does not have 180° rotational symmetry about the central axis (B).

8. A cutting insert comprising:
    two identical opposing end surfaces, each end surface having four corners including two diagonally opposed lowered corners and two diagonally opposed raised corners, the lowered corners being closer to a median plane of the cutting insert than the raised corners;
    a peripheral side surface extending between the two end surfaces, the peripheral side surface comprising two major side surfaces connected to two minor side surfaces;
    four major cutting edges, each major cutting edge being formed at the intersection of each major side surface with each end surface; wherein:
    each major side surface has recesses formed therein interrupting each major cutting edge at recessed cutting edge portions, each recessed cutting edge portion being located between two non-recessed cutting edge portions; and
    each recessed cutting edge portion comprising, in an end view of the cutting insert, a curved central section located between two curved side sections, the central section having a first radius of curvature and each side section having a second radius of curvature, the first radius of curvature being larger than the second radius of curvature.

9. The cutting insert according to claim 8, wherein the first radius of curvature is in the range 0.7 to 0.9 mm and the second radius of curvature is in the range 0.3 to 0.5 mm.

10. The cutting insert according to claim 8, wherein the first radius of curvature is equal to 0.83 mm and the second radius of curvature is equal to 0.40 mm.

11. The cutting insert according to claim 8, wherein each non-recessed cutting edge portion is a section of one selected from the group consisting of a straight line, an ellipse and a helix.

12. The cutting insert according to claim 8, comprising:
a rake surface associated with each major cutting edge, each rake surface extending from an associated major cutting edge in a generally inward direction of the cutting insert to an inner end surface; and
a primary relief surface associated with each major cutting edge, each primary relief surface extending from an associated major cutting edge towards a middle region of the major side surface in which it is included; wherein:
in each cross section of the cutting insert taken in a plane generally perpendicular to the major side surfaces, a line tangent to each primary relief surface at a non-recessed cutting edge portion of the major cutting edge is inclined to the median plane of the cutting insert at an acute interior angle.

13. The cutting insert according to claim 8, further comprising:
two opposing minor side surfaces connecting to the two opposing major side surfaces;
four minor cutting edges, each minor cutting edge being formed at the intersection of each minor side surface with each end surface; wherein:
the minor side surfaces are devoid of recesses formed therein which interrupt the minor cutting edges at recessed cutting edge portions.

14. The cutting insert according to claim 8, wherein:
in a major side view of the cutting insert, a maximum width among the recessed cutting edge portions is less than a minimum width among the non-recessed cutting edge portions.

15. The cutting insert according to claim 8, wherein:
the major cutting edges associated with a given end surface have a different number of recessed cutting edge portions.

16. The cutting insert according to claim 8, further comprising:
a central axis (B) which passes through a through bore passing between the opposing end surfaces;
a major axis (A) which passes through both minor side surfaces and is perpendicular to the central axis (B), wherein:
the cutting insert has 180° rotational symmetry about the major axis (A); and
the cutting insert does not have 180° rotational symmetry about the central axis (B).

17. A milling cutter having identical first and second cutting inserts seated therein, wherein each cutting insert comprises:
two identical opposing end surfaces, each end surface having four corners including two diagonally opposed lowered corners and two diagonally opposed raised corners, the lowered corners being closer to a median plane of the cutting insert than the raised corners;
a peripheral side surface extending between the two end surfaces, the peripheral side surface comprising two major side surfaces connected to two minor side surfaces;
four major cutting edges, each major cutting edge being formed at the intersection of each major side surface with each end surface; wherein:
each major side surface has recesses formed therein interrupting each major cutting edge at recessed cutting edge portions, each recessed cutting edge portion being located between two non-recessed cutting edge portions; and
each recessed cutting edge portion comprising, in an end view of the cutting insert, a curved central section located between two curved side sections, the central section having a first radius of curvature and each side section having a second radius of curvature, the first radius of curvature being larger than the second radius of curvature.

18. The milling cutter according to claim 17, wherein:
in each cutting insert, the major cutting edges associated with a given end surface have a different number of recessed cutting edge portions;
an operative major cutting edge of the first cutting insert has a first number of recessed cutting edge portions;
an operative major cutting edge of the second cutting insert has a second number of recessed cutting edge portions which differs from the first number;
the recessed cutting edge portions of the operative major cutting edge of the first cutting insert are staggered relative to the recessed cutting edge portions of the operative major cutting edge of the second cutting insert.

19. The milling cutter according to claim 18, wherein each cutting insert further comprises:
two opposing minor side surfaces connecting to the two opposing major side surfaces;
four minor cutting edges, each minor cutting edge being formed at the intersection of each minor side surface with each end surface; wherein:
the minor side surfaces are devoid of recesses formed therein which interrupt the minor cutting edges at recessed cutting edge portions.

\* \* \* \* \*